United States Patent [19]

Still

[11] 4,051,863
[45] Oct. 4, 1977

[54] GATE VALVE WITH REPLACEABLE LINER

[75] Inventor: Robert C. Still, Tucson, Ariz.

[73] Assignee: New Concepts, Inc., Tucson, Ariz.

[21] Appl. No.: 716,669

[22] Filed: Aug. 23, 1976

Related U.S. Application Data

[63] Continuation-in-part of Ser. No. 614,350, Sept. 17, 1975, Pat. No. 3,993,092.

[51] Int. Cl.² ............................................. F16K 3/02
[52] U.S. Cl. ............................. 137/454.2; 251/328; 251/329
[58] Field of Search .......................... 137/454.2, 454.6; 251/329, 326, 327, 328

[56] References Cited

U.S. PATENT DOCUMENTS

| | | | |
|---|---|---|---|
| 2,893,684 | 7/1959 | Williams et al. | 251/329 X |
| 2,942,841 | 6/1960 | Stillwagon | 251/326 X |
| 3,050,077 | 8/1962 | Wheatley | 251/328 X |
| 3,164,363 | 1/1965 | Williams | 251/329 X |
| 3,350,058 | 10/1967 | Alden | 251/329 |
| 3,356,334 | 12/1967 | Scaramucci | 251/327 X |
| 3,749,114 | 7/1973 | Johnstone et al. | 251/329 X |

Primary Examiner—Arnold Rosenthal
Attorney, Agent, or Firm—Cahill, Sutton & Thomas

[57] ABSTRACT

A gate valve having a replaceable one piece bore and chest liner enclosed within a pair of mirror image castings is disclosed. The gate is cast and enveloped within molded material to cooperate with the liner in a sealing relationship.

10 Claims, 9 Drawing Figures

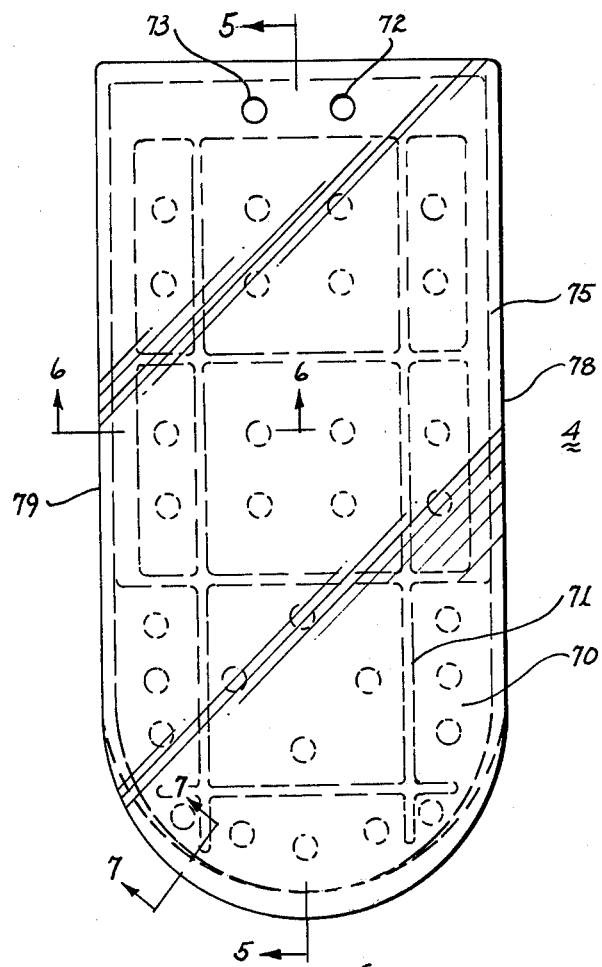
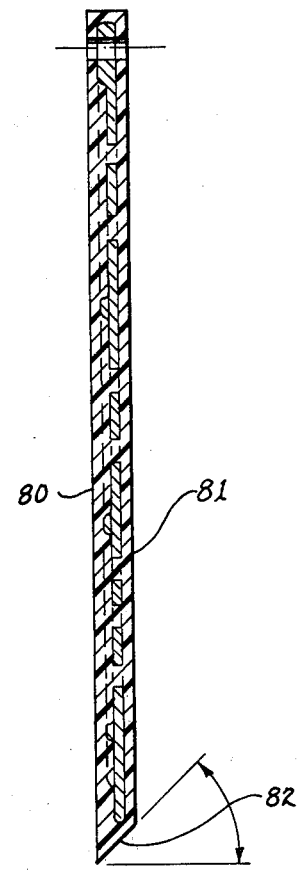
fig. 4   fig. 5
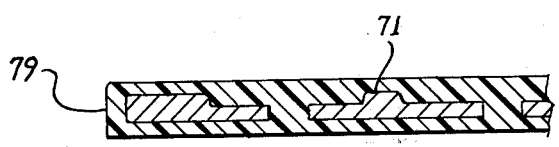
fig. 6
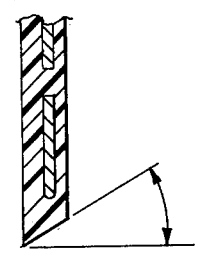
fig. 7

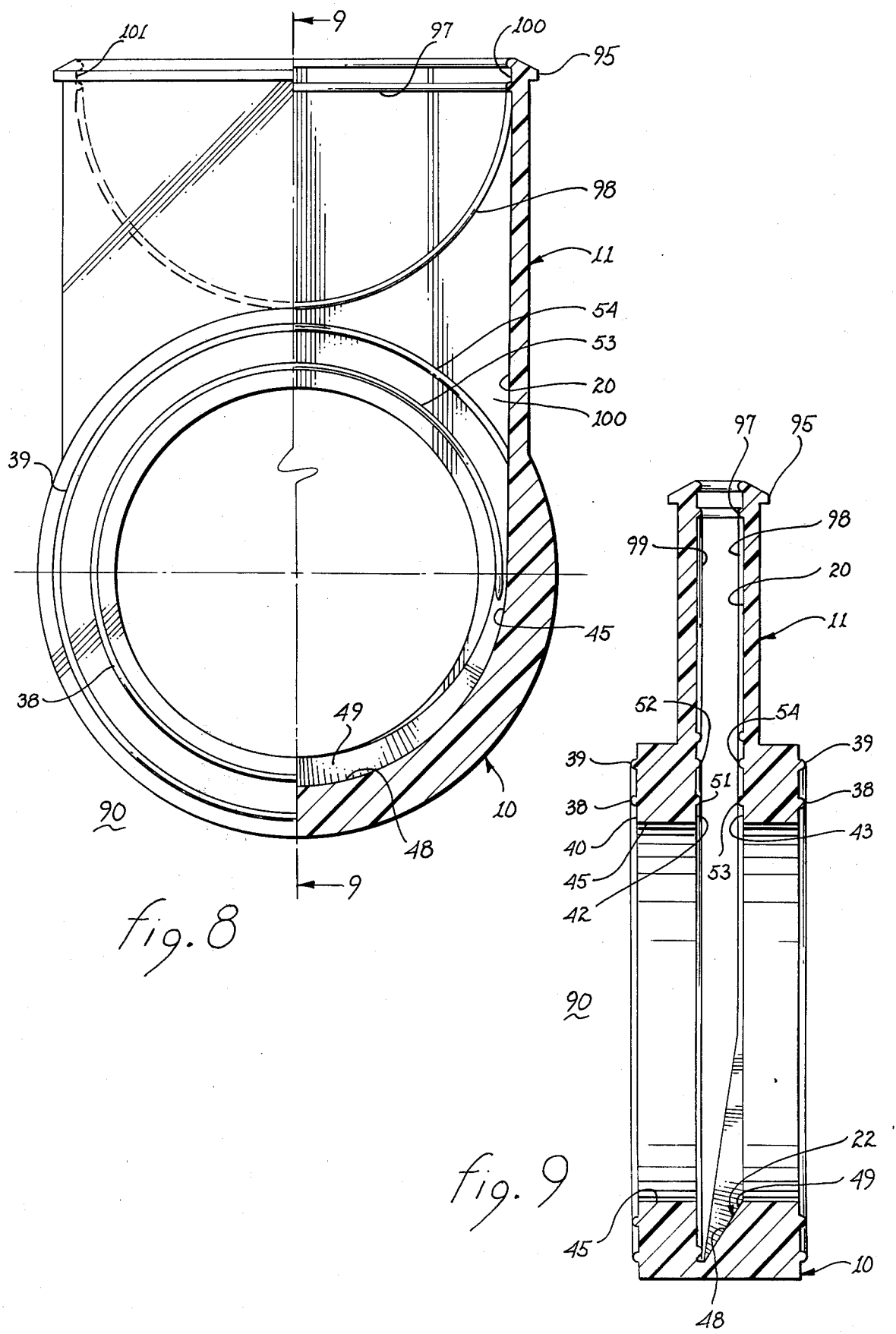

GATE VALVE WITH REPLACEABLE LINER

CROSS REFERENCE TO RELATED APPLICATION

This is a continuation in-part of a copending patent application entitled "Gate Valve with Replaceable Liner," filed on Sept. 17, 1975 and assigned Ser. No. 614,350, now U.S. Pat. No. 3,993,092, and describing an invention by the present inventor.

BACKGROUND OF THE INVENTION

Generally, a gate valve body is machined from a single piece casting. The chest and seat of the body are machined to receive a gate. The gate is milled with parallel opposed faces in close conformity with the valve body chest. Gate valves of this type must generally be replaced in toto after a period of use dependent upon the type and consistency of the fluid flowing through the gate valve. Such replacement is expensive.

In order to overcome the expenses attendant replacement of complete gate valves, various gate valves have been developed which incorporate individually replaceable chests, collars, backing strips and seats. U.S. Pat. No. 3,624,882 is representative of gate valves of this type. Herein, segregated elements forming the seat and seals are separately replaceable. U.S. Pat. No. 3,194,259, describes a gate valve having a replaceable unitary structure defining segregable and distinct elements such as the gate, gate housing, seats and gate actuating mechanisms, which structure is disposed within the gate valve body. U.S. Pat. Nos. 2,942,841, 3,164,363, 3,521,667 and 3,749,114 disclose yet further types of control valves wherein a seat element and supporting structure are readily replaceable as a unit. Other related U.S. Pat. Nos. include: 2,893,684, 3,050,077, 3,350,058 and 3,356,334.

In all the known prior art gate valves, the gates are machined to have parallel opposed surfaces in order to provide a good seal smooth operation. The requirement for such machining tends to preclude the gates from being interchangeable and necessitates that the gates be custom fitted to the gate valve bodies and necessarily increases the cost of the available gate valves. Moreover, the seals employed, except for the gland at the top of the chest, are generally concentric about the gate valve inlet and outlet. No seals are employed to preclude entrance or flow of the regulated fluid into the chest about the gate when the latter is drawn into the chest to open the gate valve. Accordingly, the space within the chest about the gate is usually continuously permeated with the regulated fluid.

It is therefore a primary object of the present invention to provide a gate valve with a replaceable one piece liner defining the chest and seat for the gate and having integrally formed seals within the chest.

Another object of the present invention is to provide a one piece bore and chest liner for receiving the gate of a gate valve which liner both seats and seals the gate.

Yet another object of the present invention is to provide a one piece pliant bore and chest liner having seals disposed in the chest for sealng the gate during both the extended and retracted position of the gate.

Still another object of the present invention is to provide a one piece liner for seating and guiding the gate of a gate valve having seals for precluding a flow of fluid into the chest.

A further object of the present invention is to provide a one piece liner for use in gate valves, which liner includes seals disposed in the chest for precluding a flow of fluid into the chest of the liner when the gate valve is in the open position.

A yet further object of the present invention is to provide a seal within the chest of a one piece chest and bore liner for gate valves, which seal is operative during both the open and closed position of the gate.

A still further object of the present invention is to provide a seal within the chest of a one piece liner for gate valves which maintains a dead space about the gate intermediate the packing gland and the bore during both the open and closed position of the gate.

These and other objects of the present invention will become apparent to those skilled in the art as the description thereof proceeds.

The present invention may be described with greater specificity and clarity with reference to the following drawings, in which:

BRIEF DESCRIPTION OF THE DRAWINGS

FIG. 4 illustrates the gate.

FIG. 5 is a cross-sectional view of the gate taken along lines 5—5, as shown in FIG. 4.

FIG. 6 is a partial cross-sectional view of the gate taken along lines 6—6, as shown in FIG. 4.

FIG. 7 is a partial cross-sectional view of the gate taken along lines 7—7, as shown in FIG. 4.

FIG. 8 illustrates a partial cross-sectional view of a variant of the linear shown in FIGS. 1, 2 and 3.

FIG. 9 is a cross-sectional view of the liner shown in FIG. 8 and taken along lines 9—9.

DESCRIPTION OF SPECIFIC EMBODIMENTS

Figure 1:
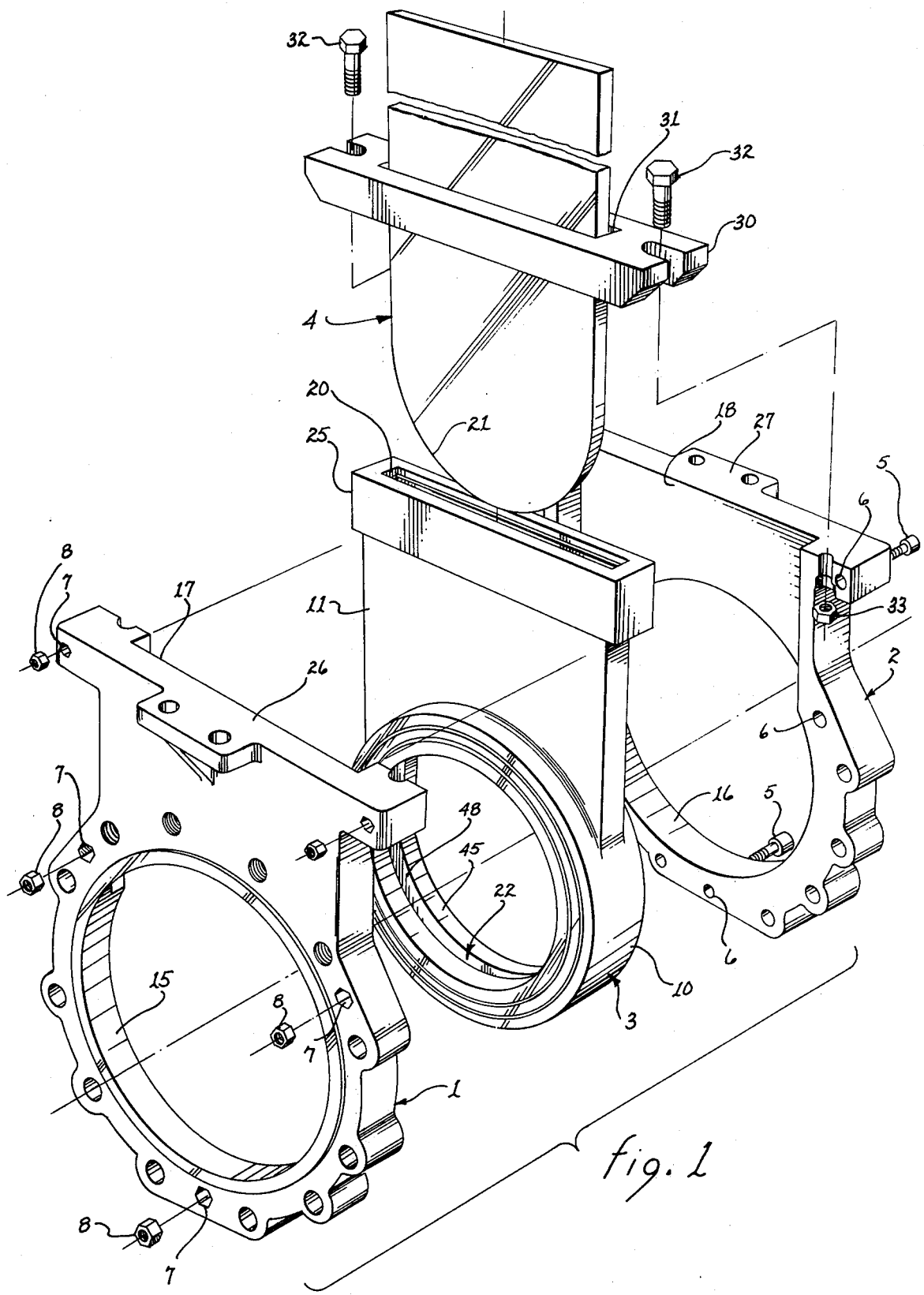
FIG. 1 is an exploded isometric view of the gate valve.

The major components of the gate vale will be described with primary reference to FIG. 1. The valve body itself is formed of a pair of castings 1 and 2. These castings may be mirror images of one another. The castings are attached to and retained adjacent one another by means of a plurality of bolts 5 extending through holes 6 of casting 2 into holes 7 of casting 1 and ultimately engaging nuts 8.

A one piece liner 3 is lodged intermediate castings 1 and 2. The liner is formed of a ring 10 having a chest 11 extending upwardly therefrom. One annular half of the ring seats within bore 15 of casting 1 and the other annular half of the ring seats within bore 16 of casting 2. One lateral half of chest 11 seats within a conformingly configured recess 17 of casting 1 and the other lateral half of the chest seats within a similarly conforming recess 18 of casting 2. A passageway 20 extends through chest 11 to receive and accommodate passage of gate 4. A depression 38 is disposed within bore 45 of ring 10 and extends downwardly from the sides of passageway 20 to serve as a seat 22 for the mating edge of gate 4. A collar 25 extends about the upper edge of chest 11 and rests upon the upper flanged surfaces 26 and 27 of castings 1 and 2, respectively. This collar serves as a sliding seal and wiper to inhibit the flow of fluid through passageway 20 adjacent the surfaces of gate 4.

A stuffing box 30 includes a slot 31 for slidably receiving gate 4. The stuffing box rests upon collar 25 and is bolted to castings 1 and 2 by bolts 32 and nuts 33.

Gate 4 is a planar member having a semicircular end defined by edge 21, which edge is configured to conform with the mating cross-sectional configuration of depression 48.

Figures 2, 3:
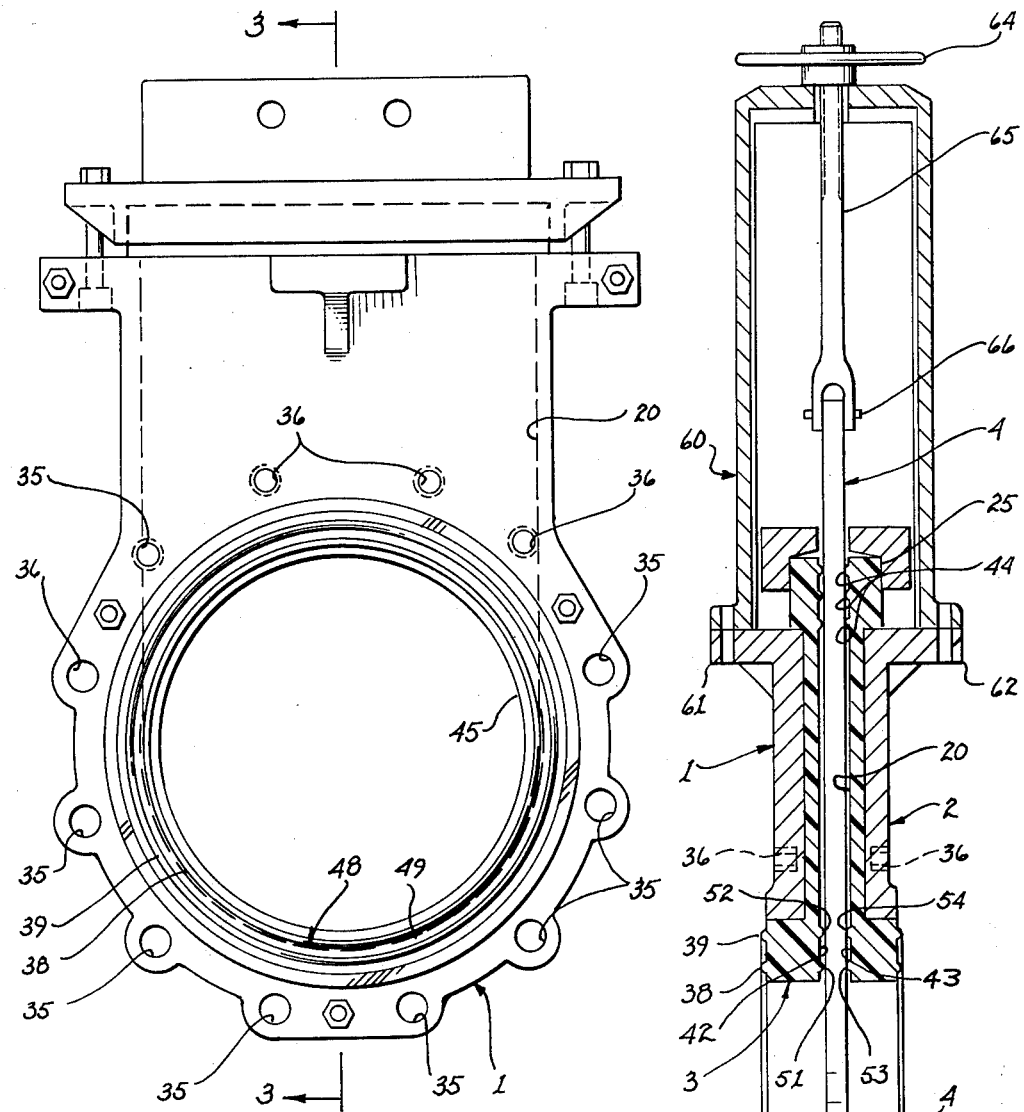
FIG. 2 is a front view of the gate valve.
FIG. 3 is a cross-sectional view of the gate valve taken along lines 3—3, as shown in FIG. 2.

The constructional and functional aspects of liner 3 will be discussed with greater specificity with joint reference to FIGS. 2 and 3. FIG. 2 illustrates the gate valve in an assembled form. Bolt holes 35 are circumscribingly positioned about the bores of the mated castings. These bolt holes receive the bolts of nut and bolt assemblies extending from an annular flange of a pipe attached to one side of the gate valve to an annular flange of another pipe attached to the other side of the gate valve. Threaded cavities 36 disposed within each of the castings in proximity to the necks of the castings, threadedly receive and engage bolts extending from the annular flange of an adjacent connected pipe. From the above description, it may be appreciated that the pipe ends abutting opposite sides of the gate valve can be drawn tightly toward one another with the forces exerted thereby being absorbed by the castings without compressing or otherwise affecting the alignment of liner 3.

A pair of concentric D-rings 38, 39 are disposed upon each of annular faces 40 and 41 of ring 10 of the liner. These D-rings bear against a planar annular face of the attached pipe to establish a seal intermediate the ring of the liner and the adjacent pipe. It may therefore be appreciated that there is no need to employ gaskets intermediate the attached pipe and surface 37 of the castings nor is a seal necessary intermediate the peripheral surface of ring 10 and bores 15 and 16 of castings 1 and 2.

A plurality of horizontally oriented spaced apart seals 44 extend inwardly within the opposing portion of passageway 20 extending collar 25. These seals bear against the surfaces of gate 4 to prevent the flow of fluid intermediate the gate and the collar.

As illustrated in FIG. 2, the width of passageway 20 is somewhat greater than bore 45 of liner 3. Depression 48, disposed within the lower half of bore 45, is in alignment with passageway 20 and of a depth equivalent to the overlap between passageway 20 and bore 45. As is apparent from the drawings, passageway 20, in combination with depression 48, serves to receive, guide and seat gate 4. For reasons which will become apparent, base 49 of depression 48 varies in angular orientation with respect to the surface of bore 45 from 0° at the lateral center of the bore to 45° at the bottom center of the bore. A D-ring seal 51 is disposed upon side wall 42 of passageway 20 within the chest and extends along the aligned side of depression 48 and thereby circumscribes bore 45. A similar D-ring wiper 52 is also disposed upon side wall 42 concentric with seal 51. A D-ring seal 53 is in opposed relationship to seal 51 upon side wall 43 of passageway 20 and extends downwardly along the corresponding side of depression 48 concentric with bore 45 until it is terminated by sloping base 49. A D-ring wiper 54 is in opposed relationship to wiper 52 and extends downwardly concentric with seal 53 until it is also terminated by sloping base 49. Seals 51 and 53 prevent fluid flow intermediate the edge of gate 4 and depression 48 and prevent fluid flow from within bore 45 into passageway 20. Wipers 42 and 54 also serve a similar sealing and wiping function. As shown, seals 51, 52, 53 and 54 are disposed near the bottom of the opposing side walls 42 and 43 of gate passageway 20.

A yoke 69 is attached to and extends upwardly from laterally oriented flanges 61 and 62, the latter being formed as a part of castings 1 and 2, respectively. Yoke 60 supports a hand wheel 64 for engaging a threaded stud 65. Stud 65 is attached to gate 4 by means such as a nut and bolt assembly 66. As is well known in the art, rotation of hand wheel 64 produces vertical movement of stud 65 to raise and lower gate 4. It is to be understood that the illustrated yoke, hand wheel and stud are merely representative of a type of apparatus for selectively raising and lowering the gate.

The structural details of gate 4 will be described with particular reference to FIGS. 4, 5, 6 and 7. The primary structural element of the gate is formed of a cast core 70. A plurality of intersecting strengthening webs 71 are disposed upon one side of the core to provide rigidity and prevent bending or twisting of the gate. Attachment means, such as apertures 72 and 73 are disposed at the top of the gate for connection to gate raising and lowering means, such as stud 65 (see FIG. 3). Synthetic plastic material 75, such as urethane, is bonded to core 70 to completely envelope the core. The overall width thickness and length of the enveloped core is dictated by the dimensions of passageway 20 and depression 48 within liner 3.

Because the surface of gate 4 and the material of liner 3 are compliable, adequately close tolerances can be maintained with state of the art molding technique. Moreover, seals 44, 51 and 53 and wipers 52 and 54 are configured to bear against the opposing surfaces of the gate with sufficient pressure and compliancy to establish a requisite sealing and wiping relationship. As is evident in the drawings, the opposing surfaces of gate 4 are spaced from the opposing side walls 42 and 43 of the gate passageway 20.

Vertical sides 78 and 79 of gate 4 are essentially perpendicular to lateral surfaces 80 and 81. The lower edges of lateral surfaces 80 and 81 are essentially semicircular but the radius of these edges are vertically off-set from one another. Thereby, side 82 varies angularly with respect to a plane defined by one of the lateral surface of an angle of 90° to an angle of 45° at the lower extremity of the base. That is, at the lower extremity of the gate, side 82 is at an acute angle with respect to lateral surface 80 and at an obtuse angle with respect to lateral surface 81. As illustrated in FIG. 7, the angle between side 82 and the lateral surfaces varies in proportion to the angular displacement away from the lower extremity of the gate.

From the above discussion, it may be appreciated that the configuration of the lower edge of gate 4 is positionally commensurate with base 49 of depression 48 within liner 3. Thus, when gate 4 is in its lowermost position, it will mate with depression 48. By maintaining an acute angle between lateral surface 80 and side 82, any sludge or other debris lodged within depression 48 as a result of fluid flow through bore 45 will tend to be displaced by the cleaving effect of side 82. Thereby there exists little likelihood of sludge or debris inhibiting closure of the gate valve.

FIGS. 8 and 9 illustrate a liner 90 which is a variant of liner 3 shown in FIGS. 1, 2 and 3. For the purposes of uniformity and simplicity, all elements of liner 90 common to liner 3 will be identified by corresponding reference numerals; moreover, most of the above description of the functional and mounting features of liner 3 are applicable to liner 90, except as specifically described below.

The upper end of chest 11 of liner 90 includes a circumscribing laterally extending flange 95 for mating with and receiving support from a pair of liner enveloping castings and/or packing gland. One or more D-ring seals 97 extend about the inner surface of cavity 20. This seal bears against the surfaces of the gate slidably positioned within chest 11. Further seals 98 and 99 are disposed upon side walls 42 and 43 of cavity 20 within chest 11. These seals define downwardly extending arcs. The extremities of each of arcs 98 and 99 are disposed in proximity to seal 97 at the lateral edges of side walls 42 and 43, respectively. The mid-point of each of arcs 98 and 99 is in proximity to the central and uppermost part of seals 54 and 52, respectively. The arcuate or curved configuration of arcs 98 and 99 is to be duplicative (normally semicircular) of the lower curved edge of sides 80 and 81 of gate 4 (see FIGS. 4 and 5).

In operation, seals 51, 52, 53 and 54 bear against the surfaces of the gate valve when the latter is fully or partially extending from chest 11 and sealingly restrict the flow of fluid into cavity 20 of the chest. When the gate is raised (retracted) seals 51, 52, 53 and 54 no longer contact the surfaces of the gate and their sealing capability is non-existent. However, seals 98 and 99 continuously bear against the surfaces of the gate and sealingly preclude flow of fluid intermediate gate 4 and the portion of side walls 42 and 43 upwardly of the seals. As the upper extremities of seals 98 and 99 terminate at the lateral edges of the respective side walls in proximity to seal 97, the portions of seal 97 disposed upon edge walls 100 and 101 preclude flow of fluid intermediate the edge of the gate and the edge walls. Seal 97 also serves as an additional or secondary seal about the gate within cavity 20. Thereby, seals 98 and 99, in conjunction with portions of seal 97 effectively provide a seal bearing against gate 4 when the latter is retracted into chest 11.

In summary, castings 1 and 2 do not have to be machined to high tolerances in order to effect adequate operation of the gate valve as none of the parts thereof are in direct control of the degree and accuracy of gate closure. Liner 3 can be molded of various synthetic or natural materials compatible with the fluid flowing through the gate and provided that the liner has some degree of pliancy. Gate 4 need not be machined but the core thereof can be cast by inexpensive processes. The material enveloping the core can be molded without jeopardizing the maintenance of sufficient tolerances; any variations in tolerance between gates is compensated for and accommodated by liner 3 and the seals and wipers forming a part thereof. Thus, each of the major elements of the gate valve can be manufactured relatively inexpensively and yet be suitable for use in controlling the flow of various types of corrosive or non-corrosive fluids. Furthermore, the gate valve is not limited in size by the characteristics of the material forming liner 3 and gate 4 as the castings (1, 2) and core 70 are of sufficient strength and serve as the load supporting elements. Similarly, the gate valve is not limited with respect to the pressure of the fluid flowing therethrough as neither the liner nor the material enveloping the gate core are the critical pressure regulating factors.

Necessarily, all gate valves require periodic maintenance to replace or repair the gate and/or the gate seat. In the present invention, such maintenance is quickly accomplished by separating the castings from one another and replacing the liner in toto. As the liner readily fits within mating bores and recesses, little skill is necessary to effect accurate replacement. Similarly, the gate is readily replaced without any honing, machining or otherwise fitting the gate within its supporting structure and seat. Again, highly skilled artisans are not needed to perform maintenance upon the gate and yet there is little danger of reassembling the gate valve incorrectly or improperly.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A gate valve having a positionable gate disposed therein for regulating the flow of fluid intermediate an attached pair of pipes, said gate valve comprising:
   a. a gate having opposing surfaces and being positionable within said gate valve in a first and second position to open and close said gate valve and effect regulation of the flow of fluid;
   b. a one piece pliant liner for receiving, guiding and seating and gate, said liner including:
      i. a chest including a gate passageway with opposing side walls spaced from the opposing surfaces of said gate disposed therebetween;
      ii. a ring defining a bore and extending downwardly from said chest in general planar alignment therewith;
      iii. a depression disposed within said bore for defining a seat and a guide for said gate;
      iv. first seal means disposed near the top of of the opposing side walls within said chest and being in sealing contact with said gate for preventing a flow of fluid through said gate passageway intermediate said chest and said gate;
      v. second seal means disposed within said depression for preventing a flow of fluid through the bore of said ring on seating of said gate within said depression; and
      vi. third seal means disposed on opposing side walls within said chest for sealing contact with the opposing surfaces of said gate for preventing a flow of fluid intermediate said chest and said gate when said gate is in the first position;
   c. a pair of castings for receiving said liner, each of said castings including:
      i. bore for receiving a part of said ring;
      ii. a recess for receiving a part of said chest; and
      iii. attachment means for securing said pair of castings to one another to at least partially enclose said liner therebetween;
   whereby, said liner includes seal means for precluding a flow of fluid intermediate said gate and said chest.

2. The gate valve as set forth in claim 1 wherein said first seal means comprises at leat one seal encircling and extending inwardly within said gate passageway transverse to the direction of movement of said gate.

3. The gate valve as set forth in claim 2 wherein said third seal means comprises a pair of curvilinear D-ring seals, each said D-ring seal being disposed upon one of the opposing side walls of the chest for sealing engagement with a corresponding surface of said gate.

4. The gate valve as set forth in claim 3 wherein each end of each of said curvilinear D-ring seals engages said first seal means.

5. The gate valve as set forth in claim 4 wherein said first seal means and said third seal means define a dead space intermediate the opposing side walls of said chest and the surfaces of said gate regardless of the position of said gate with respect to said chest.

6. The gate valve as set forth in claim 5 wherein the curvilinear configuration of said third seal means is an arc.

7. The gate valve as set forth in claim 6 wherein the lower edge of said gate is curved and the arc of said third seal means is duplicative of a curved edge of said gate.

8. In a gate valve formed by (i) a gate, (ii) a one piece liner of pliant material for receiving, guiding and seating the gate and including a chest having a gate passageway with opposing side walls, a ring defining a bore having a depression disposed therein and extending downwardly from the chest and a depression disposed within the bore in general alignment with the gate passageway for defining a seat and guide for the gate, and (iii) a pair of castings for receiving the liner, each casting including a bore for receiving a part of the ring, a recess for receiving a part of the chest and attachment means for securing the pair of castings to one another to at least partially enclose the liner therebetween, the improvement comprising:
 a. first seal means disposed upon the opposing side walls near the top of the gate passageway and being in sealing contact with the gate for preventing a flow of fluid through the gate passageway;
 b. second seal means disposed within the depression for preventing a flow of fluid through the bore of the ring on seating of the gate within the depression; and
 c. third seal means disposed on each of one pair of opposing sidewalls intermediate said first and second seal means for establishing a dead space within the gate passageway regardless of the position of the gate by sealingly engaging the corresponding surfaces of the gate.

9. The improvement as set forth in claim 8 wherein said third seal means is curvilinear and extends downwardly from said first seal means.

10. The improvement as set forth in claim 9 wherein the lower edge of the gate is curvilinear and the curvature of said curvilinear third seal means corresponds to the curvature of the lower edge of the gate.

* * * * *